(12) United States Patent  (10) Patent No.: US 8,955,848 B2
Roddis  (45) Date of Patent: Feb. 17, 2015

(54) MECHANICAL SEAL (75) Inventor: Alan James Roddis, Sheffield (GB)

(73) Assignee: AES Engineering Ltd., Rotherman (GB)

(*) Notice: Subject to any disclaimer, the term of this patent is extended or adjusted under 35 U.S.C. 154(b) by 909 days.

(21) Appl. No.: 12/276,854

(22) Filed: Nov. 24, 2008

(65) Prior Publication Data

US 2009/0127792 A1    May 21, 2009

Related U.S. Application Data (63) Continuation-in-part of application No. PCT/GB2007/001866, filed on May 22, 2007.

(51) Int. Cl.
*F16J 15/34* (2006.01)
*F16J 15/36* (2006.01)

(52) U.S. Cl.
CPC .............. *F16J 15/36* (2013.01); *F16J 15/348* (2013.01); *F16J 15/3484* (2013.01)
USPC ........................... 277/370; 277/372; 277/373

(58) Field of Classification Search
USPC .................. 277/377, 390, 399, 370, 372, 373
See application file for complete search history.

(56) References Cited

U.S. PATENT DOCUMENTS

| 2,521,137 | A  | * | 9/1950 | Vedovell ...................... 277/391 |
| 3,117,793 | A  | * | 1/1964 | Hauser et al. ................ 277/372 |
| 5,725,219 | A  |   | 3/1998 | Gilbert |
| 6,220,601 | B1 | * | 4/2001 | Keller et al. .................. 277/381 |
| 7,163,206 | B2 | * | 1/2007 | Cross et al. ................... 277/399 |
| 2005/0077685 | A1 | * | 4/2005 | Roddis et al. ................ 277/390 |

FOREIGN PATENT DOCUMENTS

GB          2391275 A        2/2004

* cited by examiner

*Primary Examiner* — Vishal Patel
*Assistant Examiner* — Michael Wills, III
(74) *Attorney, Agent, or Firm* — Edwin D. Schindler (57) ABSTRACT

A mechanical seal includes an elastomeric member, a spring biasing device, a longitudinally floating first member, a longitudinally non-floating second member and a longitudinally floating seal face. The elastomeric member is in a sealing engagement with the seal face. The first and second members and the spring biasing device are longitudinally positioned between the seal face and the second member. The first member and the second member are longitudinally restrained and rotationally coupled by at least one substantially male radially protruding portion in one of the members engaging in at least one substantially female portion in the other member of the two members. The first and second members are arranged for a sealing engagement with the seal face in a single seal utilizing the elastomeric member, or with the seal face and an additional seal face in a double seal utilizing an additional elastomeric member.

10 Claims, 10 Drawing Sheets

MECHANICAL SEAL

CROSS-REFERENCE TO PRIOR APPLICATION

This is a continuation-in-part of P.C.T. Application No. PCT/GB2007/001866, filed May 22, 2007, designating the United States, and published as P.C.T. Application Publication No. WO 2007/135402 A1; the entire disclosure of which being incorporated by reference herein.

BACKGROUND OF THE INVENTION

1. Field of the Invention

This invention relates to mechanical seals, which are fitted to rotating equipment in virtually all types of industries.

A mechanical seal comprises a "floating" component which is mounted axially movably around the rotary shaft of, for example, a pump and a "static" component which is axially fixed, typically being secured to a housing. The floating component has a flat annular end face, i.e. its seal face, directed towards a complementary seal face of the static component. The floating component is urged towards the static component to close the seal faces together to form a sliding face seal, usually by means of one or more spring members. In use, one of the floating and static components rotates; this component is therefore referred to as the rotary component. The other of the floating and static components does not rotate and is referred to as the stationary component.

Those seals whose floating component is rotary are described as rotary seals. If the floating component is stationary, the seal is referred to as a stationary seal.

If the sliding seal between the rotary and stationary components are assembled and pre-set prior to dispatch from the mechanical seal manufacturing premises, the industry terminology for this is "cartridge seal." Alternatively, if the rotary and stationary components are individually dispatched (unassembled) from the mechanical seal manufacturing premises, the industry terminology for this is "component seal."

Mechanical seals are used in all types of industries to seal a variety of different process media and operating conditions. The general industry term which defines the area adjacent to the process media is "inboard". The industry term which defines the area adjacent to the atmospheric side is "outboard."

Like most industries, the mechanical seal industry is highly competitive. As a result, mechanical seal manufacturers constantly seek methods of improving competitive advantage.

2. Description of the Prior Art

Pressed and formed components are one way in which mechanical seal manufacturers can reduce the manufacturing cost of said component. Unfortunately pressed components can comprise the technical aspects of a single component or said aspects of a combination of components working relative to each other. One such example of this is the drive mechanism between two components working relative to each other.

As pressed components are manufactured from a given thickness of material, the cross-sectional area of the drive mechanism is traditionally thereby limited to a multiplication of said thickness.

Pressed components are generally manufactured from sheet material, typically steel or stainless steel with a material thickness of 0.2 mm to 2.5 mm. Typically, however, most mechanical seal components are pressed using 0.8 mm- to 1.2 mm-thick material.

Pressed components offer the advantage that, in most cases, subsequent machining operations are not necessary. This therefore reduces the manufacturing cost considerably.

The disadvantage of using said pressed parts is the effective drive mechanism between said parts.

Gilbert, U.S. Pat. No. 5,725,219 teaches a mechanical seal design whereby two pressed and substantially thin components engage each other via intermeshing castellantions. Said castellantions comprised of an open longitudinal end in each member and, when engaged with each other, are intended to transmit the rotational drive between two longitudinal spaced sealing points within the seal assembly.

In practice this design suffers from several drawbacks, namely;

The torsional forces acting on the interface surface between the two substantially thin members which are mounted in a radially resilient member and subjected to equipment vibration, is the equivalent to a person pressing two knife edges together while on a rowing boat in the sea in the middle of a storm. In practice, said thin members radially misalign and rotationally twist inside of each other, thereby negating any substantial rotational drive benefit between the two members.

The longitudinally open ended castellations have sharp edges/corners, given the substantially thin material and their perpendicular position to the longitudinal end of each member. Said sharp edges/corners not only damage the substantially resilient/rubber like sealing member but often damage/cut operators hands during installation of the seal onto the equipment.

In the seals longitudinally uncompressed state, the open ended longitudinal castellations of each member can disengage creating an installation issue. Furthermore, the spring member, positioned between the two longitudinally floating members provides a longitudinal force which is applied directly to the flexible longitudinal sealing element, leading to stretching and/or tearing of said member.

A design, which offers a mechanical seal component which is fully, or partly, manufactured in an economical manner, such as, e.g., a pressing operation, and which includes a drive design, which is not limited to the material thickness, is deemed to be particularly advantageous.

United Kingdom Patent Application No. 2,391,275 defines a method of improving the drive mechanism in assemblies containing thin, pressed materials. However, because of the substantially annular surface of each member contained in said drive mechanism and the assembly of said members, the invention mechanism is limited to comprise of two separate and substantially different drive member designs; one substantially U-shaped and one substantially L-shaped. Said different drive member designs can lead to assembly errors and/or lead to extended assembly time. Furthermore, the L-shape members are not optimised to provide an improved drive surface area, over and above the thickness of the substantially thin material of construction.

It is therefore deemed to be advantageous if the drive mechanism between two members of a seal incorporates a substantially thick surface drive area, and can be assembled in such a manner that assembly errors are eliminated, assembly time/cost is reduced and subsequent retainment operations to longitudinally constrain said members are eliminated.

Subsequent retainment operations are defined as punching or staking operations which deform at least one component after the assembly of said components thereby prevent at least two parts from disassembling.

SUMMARY OF THE INVENTION

It is deemed to be advantageous, and an object of the present invention, if the two longitudinally separated members, which are sealed with a common sealing member, are longitudinally restrained before applying a stretching force on said sealing member.

A structure where the raw material creation process thereafter has no subsequent machining operations such as turning, milling or drilling is of further advantage.

Furthermore, it is advantageous, and yet an additional object of the present invention, if the seal assembly incorporates a minimum number of components, and/or the components are of simple construction, thereby helping further to reduce the cost of the assembly.

The foregoing and related objects and advantages are accomplished by the mechanical seal of the present invention, which includes an elastomeric member, spring biasing means, a longitudinally floating first member, a longitudinally non-floating second member and a longitudinally floating seal face. The elastomeric member is in a sealing engagement with the seal face. The first and second members and the spring biasing means are longitudinally positioned between the seal face and the second member. The first member and the second member are longitudinally restrained and rotationally coupled by at least one substantially male radially protruding portion in one of the members engaging in at least one substantially female portion in the other member of the two members. The first and second members are arranged for sealing engagement with the seal face in a single-seal utilizing the elastomeric member, or with the seal face and an additional seal face in a double-seal utilizing an additional elastomeric member.

The general principle of mechanical seals in accordance with the present invention may be used not only in the case where the shaft is a rotary member and the housing is a stationary member, but also in the reverse situation, that is to say, in which the shaft is stationary and the housing is rotary.

Furthermore, the invention may be embodied in both rotary and stationary arrangements, cartridge and component seals with metallic components as well as non-metallic components.

Other objects and features of the present invention will become apparent when considered in combination with the accompanying drawing figures which illustrate certain preferred embodiments of the present invention. It should, however, be noted that the accompanying drawing figures are intended to illustrate only certain embodiments of the claimed invention and are not intended as a means for defining the limits and scope of the invention.

DETAILED DESCRIPTION OF THE PREFERRED EMBODIMENTS AND DRAWING FIGURES

Figure 1:
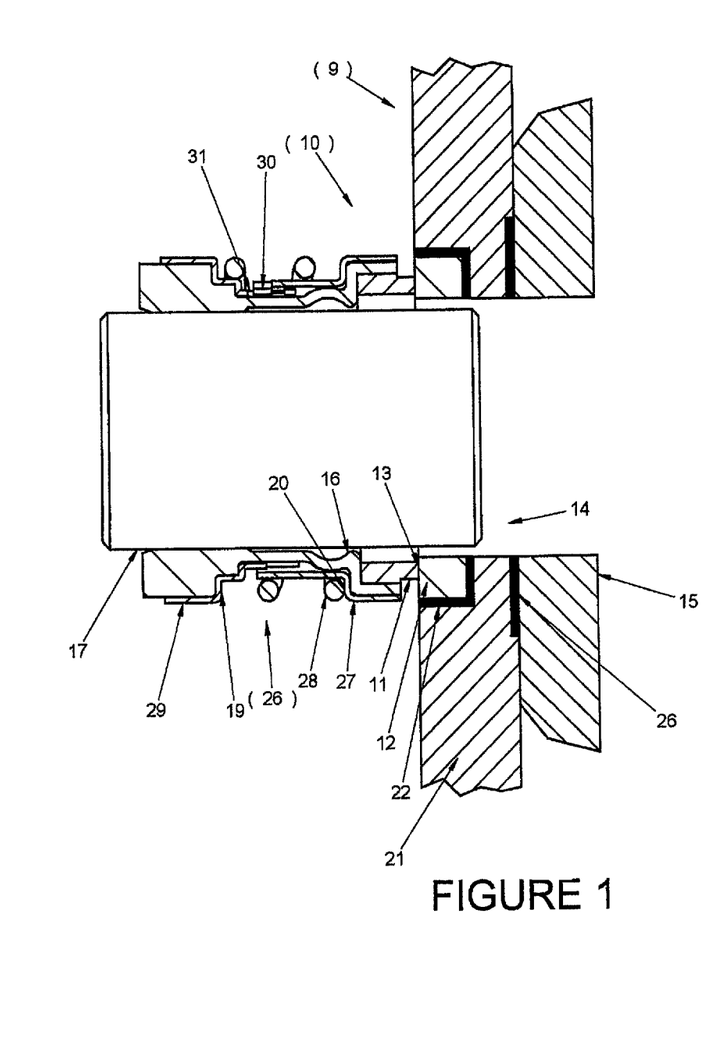
FIG. 1 shows a partial cross sectional view of the first embodiment of the invention.

Turning now, in detail, to FIG. 1 of the accompanying drawings, there is illustrated, of a mechanical seal 10, shown in longitudinal section, of the invention mounted in an item of rotating equipment 9.

The rotary and axially floating seal face 11 is spring-biased towards a static stationary seal face 12. The rotary seal face 11 is allowed to slide on the static seal face 12. The interface between the rotary seal face 11 and stationary seal face 12 forms sealing area 13. This sealing area 13 is the primary seal that prevents the process media 14 from escaping from the process chamber.

In addition to the sliding seal face 13, the process media 14 is sealed by a rotary elastomeric member 16 in contact with the shaft 17 and rotary seal face 11. This provides a first secondary sealing area.

The second secondary sealing area is formed between stationary seal face 12 and stationary gland plate assembly 21 using elastomeric member 22.

The third secondary sealing area is formed between the gland plate assembly 21 and the process chamber 15 using gasket 26.

The three secondary sealing devices and the primary sliding sealing interface prevent the process media 14 from escaping from the process chamber 15.

The static seal face 12 is prevented from rotating by radial squeeze between the elastomeric member 22 and the gland plate assembly 21. It is deemed obvious that an alternate anti-rotation device could be incorporated into the design if so desired.

The rotary sealing assembly 26 comprises of rotary holder 27. Rotary holder 27, is preferably a pressed metallic construction and incorporates a radially extending portion 20, which abuts to one end of a longitudinal spring 28. Said rotary holder 27 transmits the longitudinal spring 28 force to the rotary seal face 11.

Drive ring 29 is fitted to the radially outwardly portion of elastomeric member 16. The drive ring 29 radially compresses elastomeric member 16 to form a seal to the shaft 17.

The rotational movement from the shaft 17 is transmitted through the elastomeric member 16 to drive ring 29. Thereafter, drive ring 29 transmits the rotational movement to the rotary holder 27 by at least one drive lug 30 engaging in one drive slot 31.

The rotary holder 27 then transmits the rotational movement to the seal face 11 via the radial compression of the elastomeric member 16.

It is deemed obvious that a variety of drive mechanisms could be incorporated into said design to perform a drive between said rotary holder 27 and the seal face 11. An example of such drive mechanism is a pin in a slot.

Drive ring 29 is, preferably a pressed metallic construction and incorporates a radially extending portion 19, which abuts to the other longitudinal end of the spring 28.

Figure 2:
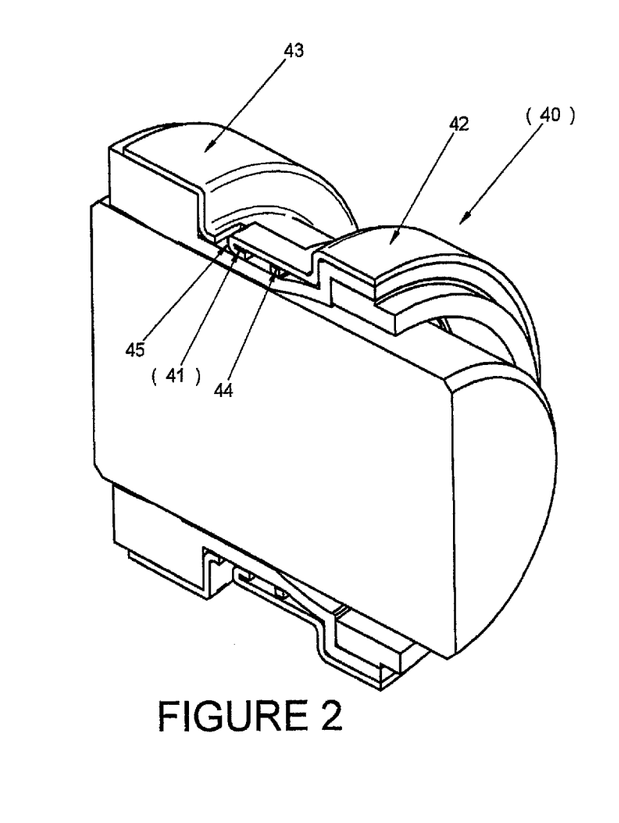
FIG. 2 corresponds to FIG. 1 and shows a partial isometric view with drive surface area greater than the material thickness of the member.

FIG. 2 corresponds to FIG. 1 and shows a partial isometric view of a further design of the invention 40 where the drive surface area 41 between the rotary holder 42 and drive ring 43 is greater than the material thickness of the pressed thin material of the drive ring 43.

From FIG. 2, it will be noted that the drive ring 43 is axially captured in rotary holder 42 by the enclosed slot 44 of drive ring 43.

Furthermore, the skilled artisan will note that at one longitudinal end of the rotary holder 42, the material is radially displaced and includes a longitudinal return 45. This maximizes the drive area 41 in contact with the slot (partially removed) in the rotary holder 42.

Figure 3:
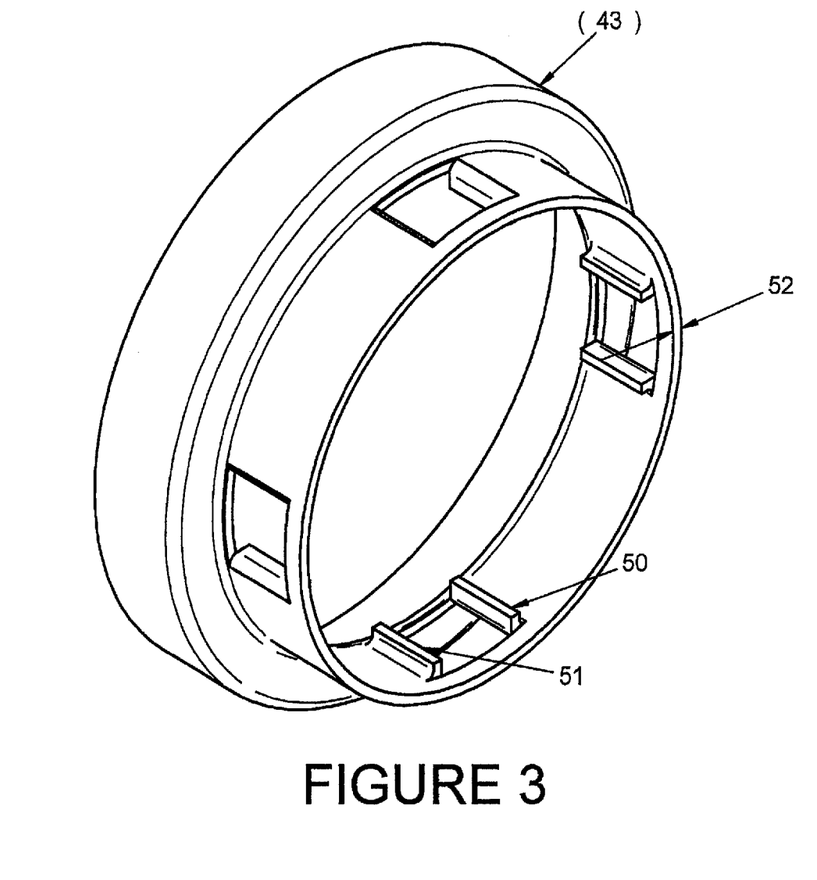
FIG. 3 corresponds to FIG. 2 and shows an isometric view of the drive ring of the invention.

FIG. 3 corresponds to FIG. 2 and shows an isometric view of the drive ring 43 illustrating radially protruding slot sides 50 and 51.

From FIGS. 2 and 3 the those skilled in the art will clearly observe that the drive surface area between the rotary holder 42 and drive ring 43 is substantially greater than the thickness of either material 52 given the axial return 45 feature and radially protruding slot sides 50, 51.

Figure 4:
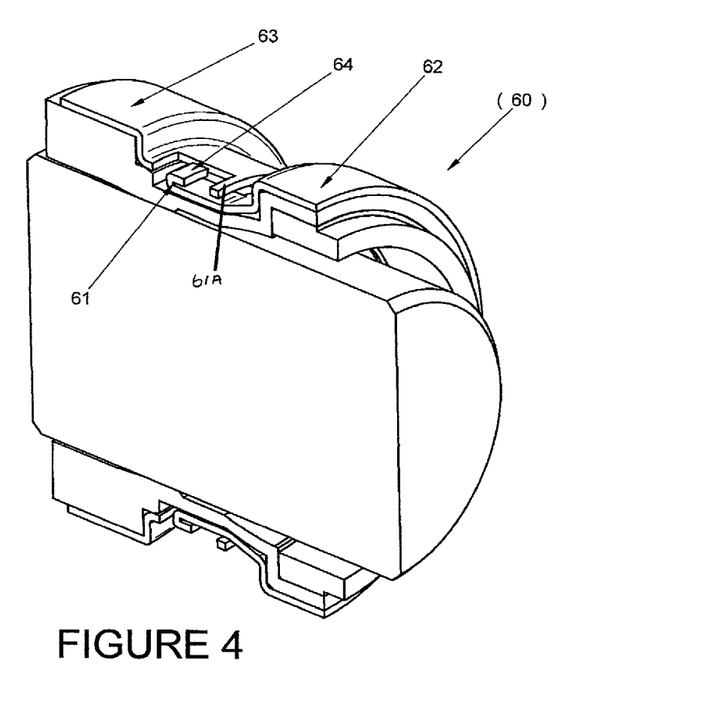
FIG. 4 shows an alternate partial isometric view of the invention.

FIG. 4 shows an alternate partial isometric view of a rotary seal 60 of the invention, showing a different radially protruding drive area design, on this occasion the radially protruding member (the male radially protruding portion) 61 and longitudinal return 64 is shown on the rotary holder 62 and interfaces with a radially larger drive ring 63. The radially compliant portion is referenced by numeral 61A.

Figure 5:
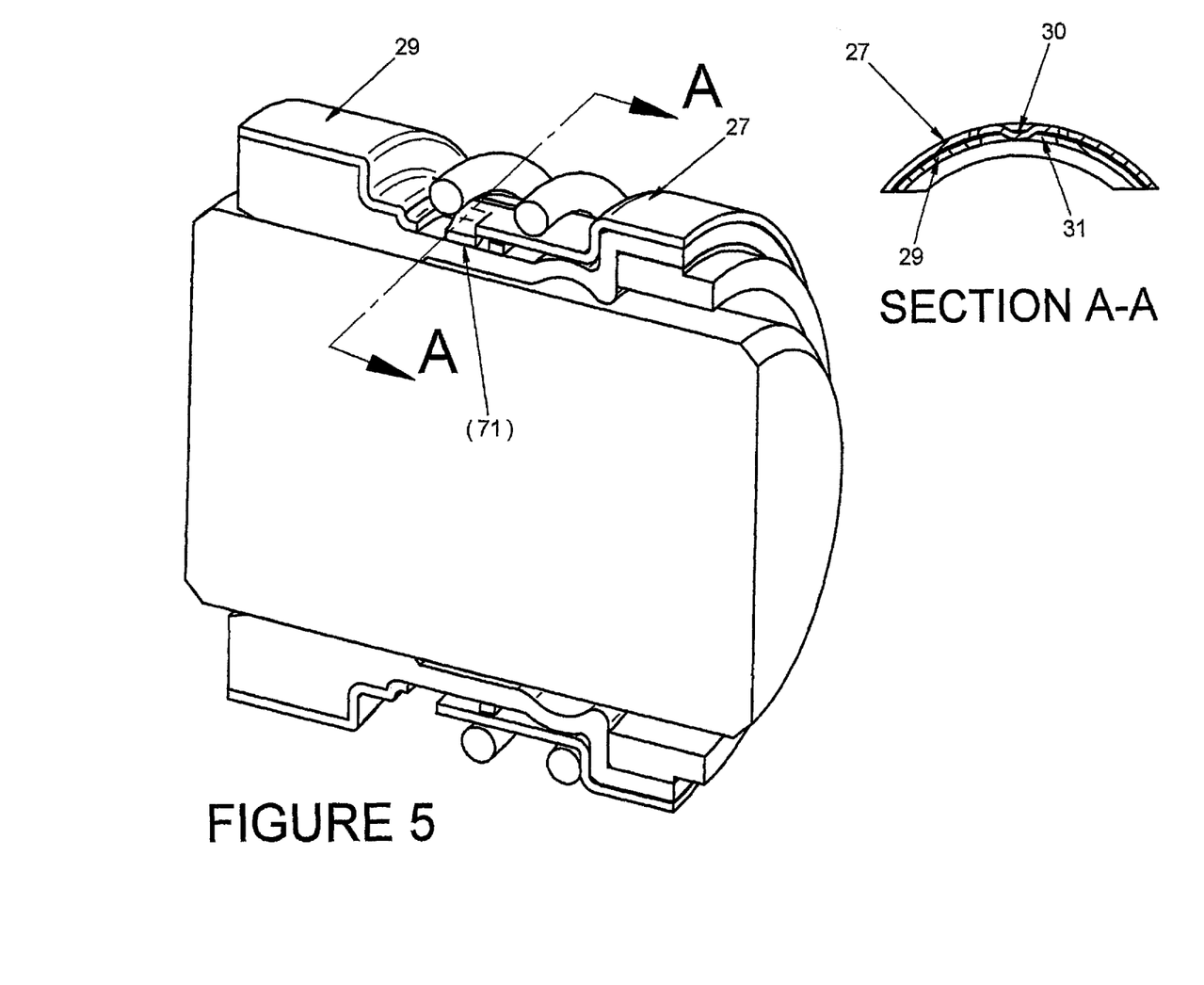
FIG. 5, by way of example only, shows a partial isometric view of an alternate drive mechanism of the invention.

FIG. 5 corresponds to FIG. 1 and shows a partial isometric view of a rotary seal 70 showing the preferred drive mechanism 71 of the invention.

FIG. 5, section A-A, illustrates at least one radially extending drive lug 30 of the rotary holder 27 engages in at least one slot 31 of the drive ring 29 thereby transmits rotational drive between the two members.

Figure 6:
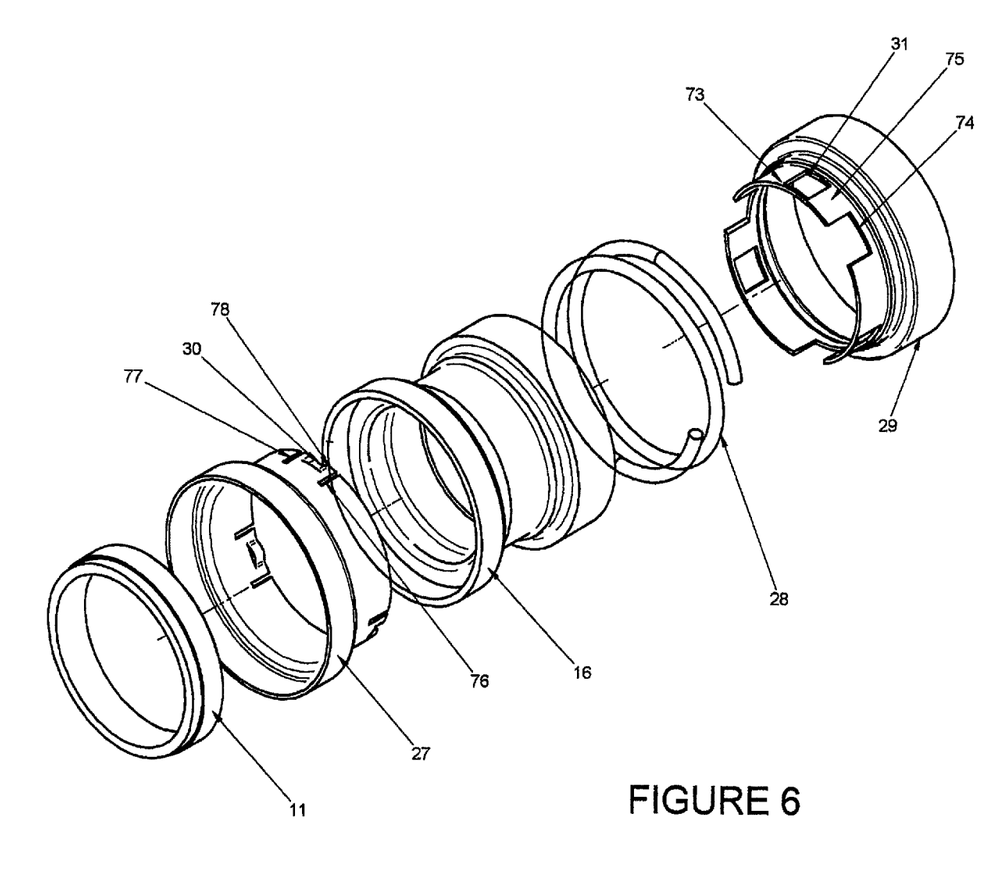
FIG. 6 corresponds to FIG. 5 and shows an exploded isometric view of the invention.

FIG. 6 corresponds to FIG. 5 and shows an exploded isometric view of the preferred embodiment of the invention.

From FIG. 6 the respective inventive steps of the invention are clear to the reader. Namely, how the radially extending drive lug 30 in the rotary holder 27 is longitudinally restrained by wall 73 when inserted into the longitudinally closed slot 31 of the drive ring 29. This is a preferred embodiment of the invention since this longitudinal restraint prevents the forces from the spring being applied to the elastomeric member 16, thereby stretching said member 16 in the un-installed position.

A further embodiment of the invention is the assembly of the two parts 29 and 27. In order to pass the radially protruding drive lug 30 of the rotary holder 27 passed wall 73 of drive ring 29, at least one assembly slot 74 is provided in the drive ring 29. The assembly slot 74 serves no purpose other than to allow said drive lug 30 into initial axial position before being rotationally moved, during assembly so that the drive lugs ride over the outer radial surface 75 or drive ring 29 and engage in at least one of the corresponding slots 31.

Preferably, a further embodiment of the invention is the two slits, 76, 77 at either circumferential side of the drive lug 30. Said slits 76, 77 provide a substantially radially flexible finger 78 adjacent to the drive lug 30. Said finger 78 aids the assembly of the radially extending drive lug 30 into the enclosed slot 31.

Figure 7:
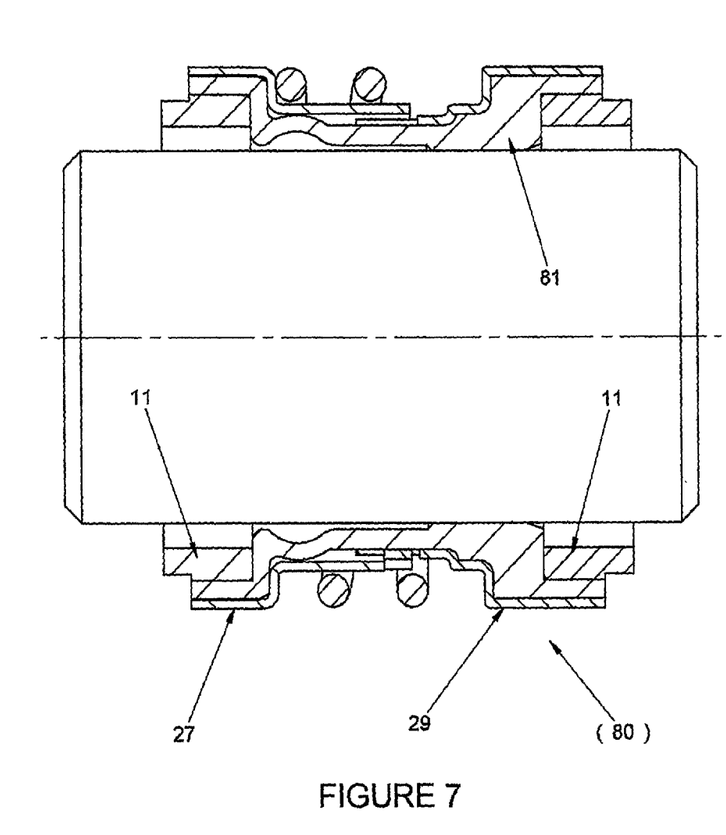
FIG. 7 shows a partial cross-sectional view of a modular dual component seal of the invention.

FIG. 7 shows a partial cross-sectional view of a modular dual rotary component seal 80 of the invention. Upon close review of FIG. 7, in conjunction with FIG. 1, the skilled artisan will note that the rotary holder 27 and drive ring 29 are identical for both single and dual component seal variants. Furthermore, the seal face 11 is also common for both the inboard and outboard sealing positions, with a new elastomeric member 81 the only additional new member to convert a single seal into a dual seal. The modularity of the invention between the single and dual seal configurations is yet a further preferred embodiment of the invention, given it means that the tooling and capital investment required to create such rotary holder 27 and drive ring 29 members is shared between the two seal configurations.

Figure 8:
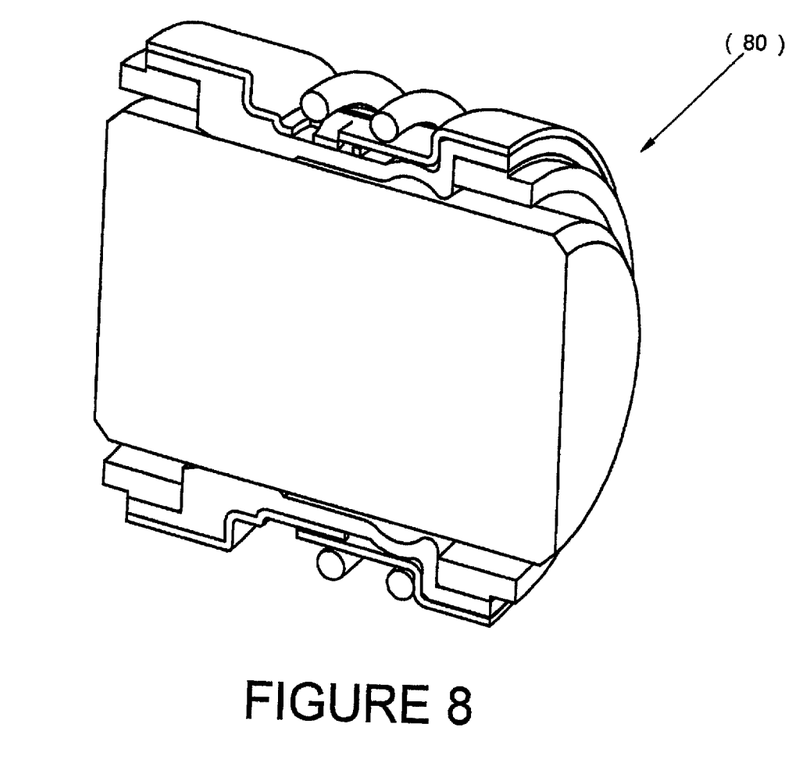
FIG. 8 corresponds to FIG. 7 and shows a partial isometric view of the modular dual component seal of the invention.

FIG. 8 corresponds to FIG. 7 and shows a partial isometric view of the modular dual component seal 80 of the invention.

Figure 9:
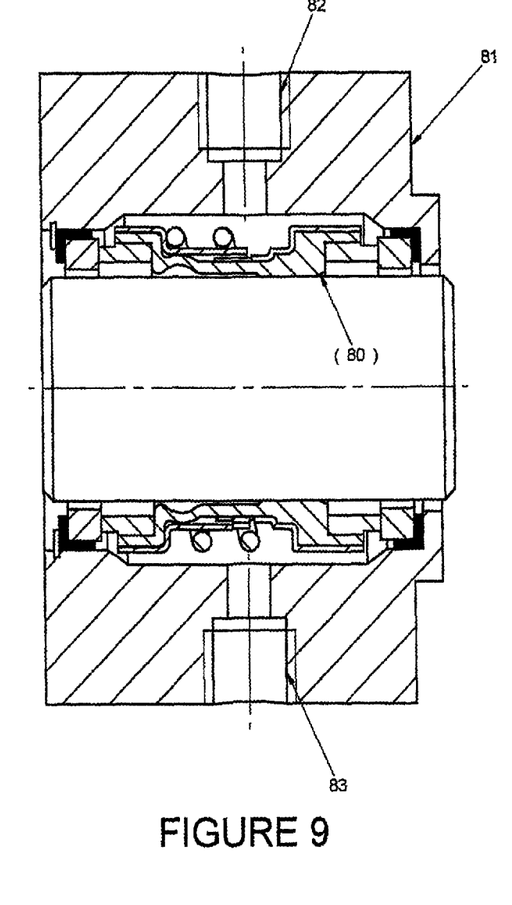
FIG. 9 shows by way of example only, the dual component seal of the invention, mounted in a gland forming a low cost dual cartridge seal; and, FIG. 10 shows a single cartridge seal of the invention.

FIG. 9 shows by way of example only, the dual component seal 80 of the invention, mounted in a gland 81 forming a low cost, longitudinally short, dual cartridge seal. Seal face lubrication may thereby be added through gland orifices 82 and 83 as the experienced artisan will understand.

Figure 10:
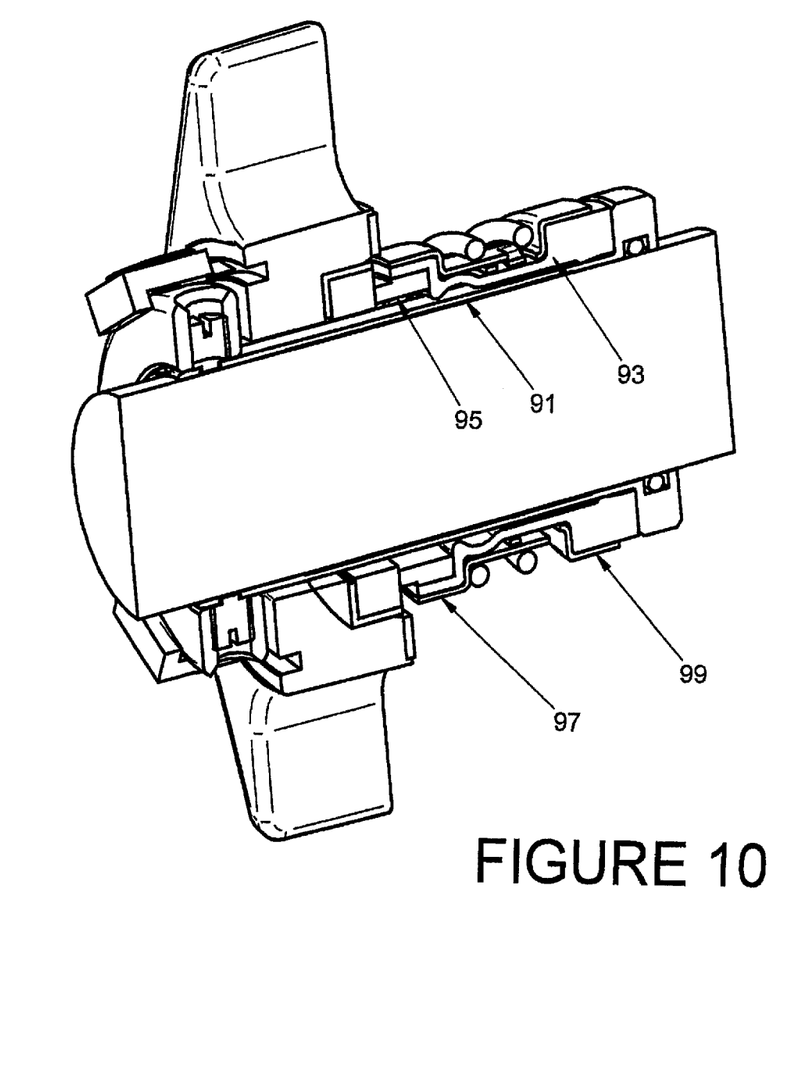

FIG. 10 shows a single cartridge seal of the invention in which the rotary components are mounted on a sleeve 91. The elastomeric bellows 93 is shaped to seal face 95 and rotary holder 97 at one end thereof and between sleeve 91 and drive ring 99 at its other end. By replacing the bellows 93 with another, appropriately shaped bellows, the seal components can be used with a dual mechanical seal.

It is considered self evident to the experienced artisan that the invention may be employed for both rotary seals and stationary seals, single-, double- or triple-mechanical seals, whether designed in a cartridge or component seal format.

It is also considered self evident that the invention may be used with metallic components, as well as non-metallic components, such as, for example, plastic. Some types of equipment rotate the housing and have a stationary shaft. It is considered that the invention can be similarly applied to such designs.

It is clear that the invention has many advantages in an increasingly more competitive industrial environment, where value for money/low cost and high technical performance solutions are required.

While only several embodiments of the present invention have been shown and described, it will be obvious to those skilled in the art that many modifications may be made to the present invention without departing from the spirit and scope thereof.

What is claimed is:

1. A mechanical seal, comprising:
   an elastomeric member;
   spring biasing means;
   a longitudinally floating first member having a radially compliant portion;
   a longitudinally non-floating second member; and
   a longitudinally floating seal face, said elastomeric member being in a sealing engagement with said floating seal face, said floating first member and said non-floating second member with said spring biasing means being longitudinally positioned between said floating seal face and said non-floating second member, said floating first member and said non-floating second member being longitudinally restrained and rotationally coupled by at least one substantially male radially protruding portion in one of said floating first member and said non-floating second member engaging in at least one substantially female portion having a rectangular opening for receiving said male portion in one of said non-floating second member and said floating first member, respectively, said radially compliant portion of said floating first member being substantially adjacent to at least one of said male portion and said female portion for allowing one of said male portion and said female portion to ride over the other before said male portion engages into the rectangular opening of said female portion, said radially compliant portion permitting said male portion and said female portion to be aligned circumferentially, said floating first member and said non-floating second member being in a sealing engagement with said floating seal face in a single seal utilizing said elastomeric member.

2. The mechanical seal according to claim 1, wherein said non-floating second member has a radially compliant portion substantially adjacent to at least one of said male portion and said female portion.

3. The mechanical seal according to claim 1, wherein rotational drive is transmitted from said floating first member to said non-floating second member over a cross-sectional engagement area larger than a material thickness of either said floating first member or said non-floating second member.

4. The mechanical seal according to claim 1, further comprising:
   a rotating member; and
   a stationary member with said rotating member and said stationary member being slidable relative to one another for forming a seal, said stationary member being held in place by a gland plate, thereby forming a single component mechanical seal.

5. The mechanical seal according to claim 4, wherein one or said rotating member and said stationary member is a rotary member connected to, and radially displaced from, a sleeve member, said sleeve member extending in a longitudinal direction and terminating adjacent to a clamp ring for connection to an item of rotating equipment.

6. A mechanical seal, comprising:
   a first elastomeric member;
   a second elastomeric member
   spring biasing means;
   a longitudinally floating first member having a radially compliant portion;
   a longitudinally non-floating second member;
   a longitudinally floating seal face; and
   an additional seal face, said first elastomeric member being in a sealing engagement with said floating seal face, said floating first member and said non-floating second member with said spring biasing means being longitudinally positioned between said floating seal face and said non-floating second member, said floating first member and said non-floating second member being longitudinally restrained and rotationally coupled by at least one substantially male radially protruding portion in one of said floating first member and said non-floating second member engaging in at least one substantially female portion having a rectangular opening for receiving said male portion in one of said non-floating second member and said floating first member, respectively, said radially compliant portion of said floating first member being substantially adjacent to at least one of said male portion and said female portion for allowing one of said male portion and said female portion to ride over the other before said male portion engages into the rectangular opening of said female portion, said radially compliant portion permitting said male portion and said female portion to be aligned circumferentially, said floating first member and said non-floating second member being in a sealing engagement with said floating seal face and an additional seal face in a double seal utilizing said second elastomeric member.

7. The mechanical seal according to claim 6, wherein said non-floating second member has a radially compliant portion substantially adjacent to at least one of said male portion and said female portion.

8. The mechanical seal according to claim 6, wherein rotational drive is transmitted from said floating first member to said non-floating second member over a cross-sectional engagement area larger than a material thickness of either said floating first member or said non-floating second member.

9. The mechanical seal according to claim 6, further comprising:
   a rotating member; and
   a stationary member with said rotating member and said stationary member being slidable relative to one another for forming a seal, said stationary member being held in place by a gland plate, thereby forming a single component mechanical seal.

10. The mechanical seal according to claim 9, wherein one or said rotating member and said stationary member is a rotary member connected to, and radially displaced from, a sleeve member, said sleeve member extending in a longitudinal direction and terminating adjacent to a clamp ring for connection to an item of rotating equipment.

* * * * *